(12) United States Patent
Hudgens

(10) Patent No.: US 6,733,687 B1
(45) Date of Patent: *May 11, 2004

(54) HYBRID SUPPLEMENTAL COOLANT ADDITIVE

(75) Inventor: R. Douglas Hudgens, Cookeville, TN (US)

(73) Assignee: Fleetguard, Inc., Nashville, TN (US)

( * ) Notice: Subject to any disclaimer, the term of this patent is extended or adjusted under 35 U.S.C. 154(b) by 67 days.

This patent is subject to a terminal disclaimer.

(21) Appl. No.: 09/611,332

(22) Filed: Jul. 6, 2000

(51) Int. Cl.[7] .............................................. C09K 5/00
(52) U.S. Cl. ............................ 252/73; 252/71; 252/74; 252/75; 252/76; 252/78.3; 252/380; 252/387; 252/388; 252/389.2
(58) Field of Search .......................... 252/71, 74, 75, 252/76, 78.3, 73, 380, 387, 388, 389.2

(56) References Cited

U.S. PATENT DOCUMENTS

| | | | |
|---|---|---|---|
| 3,607,757 A | 9/1971 | McDonald | 252/75 |
| 3,931,029 A | 1/1976 | Dutton et al. | 252/76 |
| 4,342,596 A | 8/1982 | Conner, Sr. | 106/14.13 |
| 4,382,008 A | 5/1983 | Boreland et al. | 252/75 |
| 4,452,758 A | 6/1984 | Wilson et al. | 422/15 |
| 4,454,050 A | 6/1984 | Bertell | 252/42 |
| 4,548,787 A | 10/1985 | Wilson et al. | 422/15 |
| 4,561,990 A | 12/1985 | Darden | 252/75 |
| 4,587,028 A | 5/1986 | Darden | 252/76 |
| 4,640,793 A | 2/1987 | Persinski et al. | 252/82 |
| 4,647,392 A | 3/1987 | Darden et al. | 252/75 |
| 4,717,495 A | 1/1988 | Hercamp et al. | 252/75 |
| 4,775,415 A | 10/1988 | Mohr et al. | 106/14.05 |
| 4,798,683 A | 1/1989 | Boffardi et al. | 252/389.54 |
| 4,851,145 A | 7/1989 | Van Neste et al. | 252/75 |
| 4,869,841 A | 9/1989 | Matteodo et al. | 252/79 |
| 4,873,011 A | 10/1989 | Jung et al. | 252/75 |
| 4,946,616 A | 8/1990 | Falla et al. | 252/75 |
| 5,002,697 A | 3/1991 | Crucil et al. | 252/389.23 |
| 5,071,580 A * | 12/1991 | Little | 252/71 |
| 5,085,793 A | 2/1992 | Burns et al. | 252/79 |

(List continued on next page.)

FOREIGN PATENT DOCUMENTS

| | | |
|---|---|---|
| EP | 0242900 B1 | 7/1991 |
| EP | 0552988 A1 | 7/1993 |
| EP | 0 739 965 | 10/1996 |
| GB | 2 049 650 | 12/1980 |
| GB | 2 138 837 | 10/1984 |

OTHER PUBLICATIONS

Standard Specification for Fully–Formulated Ethylene–Glycol–Base Engine Coolant for Heavy–Cuty Engines, ASTM Designation: D6210–98a, 1998.

(List continued on next page.)

*Primary Examiner*—Yogendra N. Gupta
*Assistant Examiner*—Derrick G Hamlin
(74) *Attorney, Agent, or Firm*—Woodard, Emhardt, Moriarty, McNett & Henry LLP

(57) ABSTRACT

In general, this invention relates to supplemental coolant additive for use in cooling systems, for example, in diesel engine cooling systems. The supplemental coolant additive includes a $C_4$–$C_6$ dicarboxylic acid, preferably adipic acid, and optionally a $C_9$–$C_{12}$ aliphatic dicarboxylic acid an aromatic monocarboxylic acid, an aromatic dicarboxylic acid and salts of these acids. The supplemental coolant additive also can include a variety of other additives including molybdate salts, nitrate salts, nitrite salts, silicate salts and buffering agents. The supplemental coolant additive is preferably provided as a solid additive or a liquid concentrate. The supplemental coolant additive is preferably added to the liquid coolant over time to provide increased coolant life. Further the supplemental coolant additive provides enhanced anti-corrosion protection in cooling systems that include hard water.

28 Claims, 1 Drawing Sheet

U.S. PATENT DOCUMENTS

| | | | |
|---|---|---|---|
| 5,192,447 A | 3/1993 | Fivizzani | 210/697 |
| 5,288,419 A | 2/1994 | Turcotte et al. | 252/76 |
| 5,320,779 A | 6/1994 | Fivizzani | 252/394 |
| 5,387,360 A | 2/1995 | Uekusa et al. | 252/73 |
| 5,422,026 A | 6/1995 | Greaney | |
| 5,607,521 A | 3/1997 | Bech-Nielsen et al. | 148/261 |
| 5,646,211 A | 7/1997 | Honda et al. | 524/406 |
| 5,668,096 A | 9/1997 | Rodzewich et al. | 510/265 |
| 5,800,732 A | 9/1998 | Coughlin et al. | 252/180 |
| 5,997,763 A | 12/1999 | Pabon, Jr. et al. | 252/79 |

OTHER PUBLICATIONS

Worden, J.A., et al., "Development of Aluminum Cooling System Components for a 10.8 Liter Diesel Engine", SAE Technical Paper Series Paper No. 960643, prepared for the International Congress & Exposition, Detroit Michigan, Feb. 26–29, 1996.

Weir, T.W., et al., "Review of Organic Acids as Inhibitors in Engine Coolants", Paper No. 960641, Society of Automotive Engineers, Inc., 1996.

Weir, Thomas W., "Testing of Organic Acids in Engine Coolants", Engine Coolant Testing: Fourth Volume, ASTM STP 1335, R.E. Beal, Ed., American Society for Testing and Materials, 1999, pp. 7–22.

Mitchell, Wayne A.; Hudgens, R. Douglas, "Development of an Extended–Service Coolant Filter", Standard Technical Publication 1335, American Society for Testing and Materials, 1999.

Cummins Service Bulletin No. 3666132–01, "Cummins Coolant Requirements and Maintenance", Cummins Engine Company, Inc., Dec. 1999.

Database WPI Section Ch, Week 198025, Derwent Publications Ltd. Abstract of JP 55062181.

Database WPI Sech Ch Week 199313, Derwent Publication Ltd. Abstract of SU 1 726 489.

* cited by examiner

HYBRID SUPPLEMENTAL COOLANT ADDITIVE

FIELD OF THE INVENTION

In general, this invention is related to a coolant additive composition. More specifically, but not exclusively, this invention is directed to a supplemental coolant additive including anti-corrosion agents for use in cooling systems and to a method of inhibiting corrosion of metal surfaces in cooling systems.

BACKGROUND OF THE INVENTION

Typically supplemental coolant additives (SCA) are formulated to include specific additives selected to inhibit and reduce corrosion of coolant system components and maintain effective heat transfer. The supplemental coolant additives typically are added to cooling systems in, for example, diesel engines to extend the service life of the coolant and provide additional anti-corrosion protection. Specific formulations are desired because with the advent of higher performance engines, particularly heavy-duty diesel engines, increasing more components of these engines are manufactured from a wide variety of materials to reduce weight and increase engine efficiency. The coolant coursing through these engines contacts the various materials. Typically additives are chosen to impart particular benefits, typically providing protection for one or more selected materials. In addition, it is not uncommon for certain additives to be selected which compliment each other's properties. Despite the specificity with which these supplemental coolant additives are formulated, the benefits associated with many of the additives can be thwarted because a large percentage of operators include hard water in the cooling system. The hard water can be added either upon initially filling the cooling system or during in-service as operators add make-up water to top off the cooling system.

Furthermore, in warmer climates, water is used in cooling systems to the exclusion of known additives such as ethylene glycol or propylene glycol. In many parts of the world, there is no ready access to suitable water for use in cooling system. Hard water includes a number of minerals, most notably calcium, magnesium and iron salts. These minerals may contribute to loss of efficacy and reduce the usable lifetime of the supplemental coolant additive. This loss can be particularly detrimental to heavy-duty diesel trucks that can cover over 10,000 miles a month. An ineffective supplemental coolant additive can require shorter service intervals, allow internal passageways in the cooling system to clog, contribute to cylinder liner pitting and water pump cavitation—all which result in costly engine overhauls.

Thus in light of the above described problems, there is a continuing need for advancements in the supplemental coolant additives and improved methods for reducing corrosion associated. with cooling compositions. The present invention is such an advancement and provides a wide variety of benefits and advantages.

SUMMARY OF THE INVENTION

The present invention relates to novel supplemental coolant additives, the manufacture and use thereof. Various aspects of the invention are novel, nonobvious, and provide various advantages. While the actual nature of the invention covered herein can only be determined with reference to the claims appended hereto, certain forms and features, which are characteristic of the preferred embodiments disclosed herein, are described briefly as follows.

In one form the present invention provides a supplement coolant additive comprising: a corrosion inhibitor component, which includes adipic acid or a salt thereof, a nitrite salt, a molybdate salt and at least one compound selected from the group consisting of: a nitrate salt, a silicate salt, mercaptobenzothiazole, benzotriazole and tolyltriazole; and a buffering agent including a sodium salt of at least one of a borate salt or a phosphate salt.

In another form the present invention provides a supplement coolant additive comprising a corrosion inhibitor component that includes adipic acid or a salt thereof, a nitrite salt, a molybdate salt and at least one of nitrate, silicate, mercaptobenzothiazole, benzotriazole, or tolyltriazole; a buffering agent; and hard water.

In still yet another form the present invention provides a method of reducing the corrosion of metal surfaces in a cooling system having a recirculating liquid coolant comprising hard water. The method comprises adding to the liquid coolant, an anti-corrosion additive including a buffering agent, adipic acid or a salt thereof, a molybdate salt, a nitrite salt, and at least compound selected from the group consisting of: mercaptobenzothiazole, benzotriazole, tolyltriazole, a nitrate salt and a silicate salt.

It is one object of this invention to provide a hybrid supplemental coolant additive. Further objects, features, aspects, forms, advantages and benefits shall become apparent from the description and drawings contained herein.

DETAILED DESCRIPTION OF THE INVENTION

Figure 1:
FIG. 1 is a scanned image of two aluminum coupons after evaluation in different engine antifreeze compositions according to the Erosion Corrosion Bench Test.

For the purposes of promoting an understanding of the principles of the invention, reference will now be made to the embodiments illustrated herein and specific language will be used to describe the same. It will nevertheless be understood that no limitation of the scope of the invention is thereby intended. Any alterations and further modifications in the described processes, systems or devices, and any further applications of the principles of the invention as described herein, are contemplated as would normally occur to one skilled in the art to which the invention relates.

In general, the present invention includes a supplemental coolant additive, preferably in the form of a solid, a paste, or a liquid concentrate that can be added to an engine cooling system. In one embodiment, the supplemental coolant additive can be provided in the form of a slow release a additive that can be included in, for example, a coolant filter of the type disclosed in U.S. Pat. No. 5,772,873 entitled: "Slow Release Coolant Filter," which is hereby incorporated by reference in its entirety. The supplemental coolant additive includes an anti-corrosive component that comprises one or more dicarboxylic acids or mixtures thereof, one or more azole compounds, an inorganic salt, and preferably a buffering component. The supplemental coolant additive of this invention can also include a variety of other agents, including, for example, scale inhibitors, defoamers, detergents and lubricants.

In preferred embodiments, the supplemental coolant additive includes a specifically tailored combination of anti-corrosion agents and buffering agents to reduce the corrosion associated with coolant. A preferred supplemental coolant additive can provide enhanced protection against corrosion, particularly in cooling systems' that contain hard water.

The term "hard water" when used in this present application is understood as water that includes a variety of minerals or inorganic salts, particularly cationic alkali metal salts, for example, calcium salts, magnesium salts, iron salts. Hard water can typically be evaluated in terms of its hardness level, which is often reported in parts per million (ppm). Hardness can be determined using a variety of commercially available water test kits, for example, using a test kit sold under the trademark Monitor C™ by Fleetguard, Inc. Water is considered to be hard at a hardness level of about 170 ppm or greater and very hard at a hardness level of about 300 ppm or greater.

The supplemental coolant additive includes an organic acid component comprising at least one $C_4$ to $C_6$ dicarboxylic acid. In a preferred embodiment, the dicarboxylic acid is selected to be adipic acid or a salt thereof. The $C_4$ to $C_6$ dicarboxylic acid or salt thereof is provided in amounts sufficient to inhibit corrosion of metal surfaces in the cooling system. Preferably the supplemental coolant additive includes the $C_4$ to $C_6$ dicarboxylic acid or its salt in an amount ranging between about 0.1 percent by weight (wt %) and about 10 wt % measured as the free acid and based upon the total weight of the supplemental coolant additive. More preferably the supplemental coolant additive includes the $C_4$ to $C_6$ dicarboxylic acid or its salt in amounts ranging between about 0.5 wt % and about 5 wt %.

In another form the supplemental coolant additive can include one or more of an additional organic acid selected from a $C_9$ to $C_{12}$ aliphatic dicarboxylic acid, an aromatic monocarboxylic acid, or an aromatic dicarboxylic acid or a salt of these acids. Specific examples of $C_9$ to $C_{12}$ aliphatic dicarboxylic acids include: Azelaic acid, sebacic acid, undecanedioic acid and dodecanedioic acid or salts of these acids. Examples of aromatic carboxylic acids for use with this invention include: Benzoic acid, $C_1$–$C_4$ alkyl substituted derivations of benzoic, such as, toluic acid, ethyl benzoic acid, t-butyl benzoic acid; phthalic acid, isophthalic acid, terephthalic acid and $C_1$–$C_4$ alkyl substituted derivations of these acids.

The supplemental coolant additive includes the additional organic acid in varying amounts. Preferably the supplemental coolant additive can include the additional organic acid or its salt in an amount between about 0.1 wt % and about 40 wt % measured as the free acid and based upon the total weight of the supplemental coolant additive. More preferably, the supplemental coolant additive can include between about 0.5 wt % and about 7 wt % of the additional organic acid or salt thereof; still yet more preferably the supplemental coolant additive includes between about 1 wt % and about 5 wt % of the additional organic acid or salt thereof.

The salts of these acids are preferably, but not exclusively, ammonium, tetraalkyl ammonium and alkali metal salts and would include, for example, lithium, sodium and potassium cations, although it is understood that sodium and potassium salts are more preferred.

The supplemental coolant additive of the present invention also includes additional anti-corrosive additives. The anti-corrosive additives can be either an organic additive or an inorganic additive. Examples of organic anti-corrosive additives include azoles such as benzotriazole, tolytriazole, and mercaptobenzothiazole. Preferably the supplemental coolant additive of the present invention includes tolytriazole and/or mercaptobenzothiazole. The organic anti-corrosive additives can be included in varying amounts sufficient to inhibit corrosion of cooling system components, preferably in an amount between about 0.05 wt % and about 15 wt % based upon the total weight of the additive. More preferably, the supplemental coolant additive includes between about 0.5 wt % and about 10 wt % of the individual organic anti-corrosive additives.

The supplemental coolant additive can also include inorganic anti-corrosive additives. The inorganic additives include borates, phosphates, silicates, nitrates, nitrites and molybdates. These inorganic anti-corrosive additives can be employed individually at concentrations ranging between about 0.1 wt % and about 40 wt %, more preferably between about 0.5 wt % and about 30 wt %, still yet more preferably between about 1 wt % and about 20 wt %. It will be understood that the individual inorganic anti-corrosive additive need not be included in the same concentrations. For example, an illustrative additive can include between about 0.5 wt % to about 15 wt % molybdate salts; between about 1 wt % and about 40 wt % of nitrate salts and between about 1 wt % and about 40 wt % of nitrite salts, and optionally one or more of the following components: between about 0.5 wt % to about 15 wt % silicate; and between about 10 wt % and about 50 wt % phosphate salts or borate salts. The inorganic anti-corrosive additives can be provided as salts, preferably ammonium, tetraalkyl ammonium, or alkali metal salts. In preferred forms the supplemental coolant additive includes two or more of the inorganic anti-corrosive additives.

In one embodiment, the supplemental coolant additive includes a molybdate salt and a nitrite salt. The supplemental coolant additive can also include at least one anti-corrosive additive selected from the group consisting of mercaptobenzothiazole, benzotriazole, tolytriazole, a silicate salt and a nitrate salt. The basic supplemental coolant additive can be tailored for selective applications to provide enhanced aluminum protection for components of the coolant system, for example, nitrates and silicates are known to provide aluminum protection. Borates and nitrites can be added for ferrous metal protection, and benzotriazole and tolytriazole can be added for copper and brass protection. Furthermore, for heavy-duty specifications, the supplemental coolant additive can include varying amounts of an alkali metal nitrite to provide enhanced protection against pitting of cylinder liners for heavy-duty diesel engines. The supplemental coolant additive can include between about 0.5 wt % to about 15 wt % of each of the desired additives; still more preferably, the supplemental coolant additive can include between about 0.1 wt % to about 10 wt % of the additives.

The supplemental coolant additive can also include buffering agents. The buffering agents can be selected from any known or commonly used buffering agents. It will be appreciated by those skilled in the art that selected agents can exhibit both anti-corrosion and buffering properties. For example in certain formulations, benzoate salts, borate salts and phosphate can provide both buffering and anti-corrosion advantages. Preferred buffer agents for use in this invention include borate salts and phosphate salts. In one preferred embodiment, the buffering system includes a mixed phosphate/borate buffer system. It will also be understood by those skilled in the art that certain engine manufacturers, governmental organizations and/or, consumers prefer or even require selected buffering systems. While the choice of a selected buffer system is not critical for the practice of this invention, the buffering agents(s) can be selected to comply with desires and demands of end users. The supplemental coolant additive can include the buffering agent in an amount between about 1 wt % and about 50 wt %, more preferably between about 1 wt % and about 40 wt %. Therefore, the choice and concentration of buffering agent (s) can be adapted to provide a liquid coolant composition having a pH level between 7.5 and about 11. More preferably, the buffering system is selected to provide a supplemental coolant additive with a pH level between about 8.0 and about 10.

A fully formulated supplemental coolant additive typically includes a variety of other additives, including defoamers, scale inhibitors, surfactants, detergents, and dyes. Examples of defoamers include components (alone or in combination) such as silicon defoamers, alcohols such as polyethoxylated glycol, polypropoxylated glycol or acetylenic glycols. Examples of scale inhibitors include components, either alone or in combination, such as, for example, phosphate esters, phosphino carboxylate, polyacrylates, polymethacylate, styrene-maleic anhydride, sulfonates, maleic anhydride co-polymer, acrylate-sulfonate co-polymer and the like. Surfactants for use in this invention include, for example, either alone or in combination: Alkyl sulfonates, acryl sulfonates, phosphate esters, sulfosuccinate, acetylenic glycol, and ethoxylated alcohols. Detergents include non-ionic and/or anionic components such as, for example, phosphate ester surfactants, sodium alkyl sulfonates, sodium aryl sulfonates, sodium alkyl aryl sulfonates, linear alkyl benzene sulfonates, alkylphenols, ethoxylated alcohols, carboxylic esters, and the like.

The supplemental coolant additive of the present invention is blended to provide a uniform composition. The order of addition of the individual components is not critical for the practice of the invention.

As discussed above, in one form, the supplemental coolant additive can be provided as a solid for addition to a liquid cooling composition. The solid supplemental cooling additive can be in the form of a powder, pellet(s) or a larger briquette. In one preferred embodiment, the solid supplemental coolant additive in the form of a pellet or briquette is encased in an outer coating, for example, a polymeric coating. The outer coating substantially encases the selected composition. The outer coating may be hard or soft; and while each style has its own mechanism for exposing the encased supplemental coolant additive to the liquid coolant, either style is suitable for use with the present invention. Preferred coatings are polyvinylidene chloride (PVDC), ethylene vinylacetate styrene sulfonate, ethyl cellulose, ethylene vinyl acetate, co-(vinyl acetate, vinyl versate), co-(vinyl acrylate-vinyl acetate) polyvinyl acetate (PVA) and vinyl acetate/vinyl versitate (VAJVV). While the PVDC, PVA and VAIVV coating materials are insoluble coatings, the present invention is compatible with soluble coating materials. Insoluble coatings are preferred because there are no concerns about corrosion or deposits. With a soluble coating, there could be corrosion or deposit problems as the soluble coating builds up in the coolant.

In another form, the supplemental coolant additive can be provided as a paste. The paste would include a solid anticorrosive additive, such as the organic acids and their salts, the azoles, inorganic anti-corrosive additives and buffering agents as described above. Preferably the paste includes between about 80 wt % and about 95 wt % of the solid anti-corrosive additives/buffering agents. The paste may also include a carrier such as water, alcohol or glycol. In one preferred paste formulation the carrier is selected to be polyethylene glycol or propylene glycol. The paste can be used in selected applications to facilitate packing a coolant filter or coolant system. In other selected applications the paste is used as a one-time additive to a cooling system.

In still another form, the supplemental coolant additive of the present invention can be provided as a liquid concentrate. The liquid concentrate may include water and additionally can, but is not required, to include varying amounts of an alcohol or glycol to help dissolve the additives. Typical examples of alcohols/glycols include but are not restricted to: ethanol, propanol, monoethylene glycol, diethylene glycol, propylene glycol, and the like. The liquid concentrate can be added to a cooling system and diluted with either water or other compatible liquids to provide a liquid coolant. To provide optimum performance, the liquid concentrate should be thoroughly blended with the water or other compatible liquid coolant prior to use. It is preferable, but not required, to premix the concentrate with a coolant rather than use the radiator as a mixing container.

It has been determined that the present invention provides particular advantages when added to hard water. The supplemental coolant additive that includes adipic acid and at least one of a $C_9$–$C_{12}$ dicarboxylic acid, aromatic monocarboxylic acid or aromatic dicarboxylic acid or salts of these acids provides enhanced anti-corrosion properties over compositions lacking these acids or salts of these acids. The cooling composition provides enhanced aluminum and ferrous metal protection against corrosion of the coolant in the cooling system. This unexpected result will be discussed more fully below.

The supplemental coolant additive can be formulated to provide an extended service interval for the coolant system. Thus, the coolant system can maintain desired levels of the anti-corrosion agents for greater than about 150,000 miles (240,000 kilometers) of operation. It is also considered to be within the scope of this invention to provide supplemental coolant additive formulations that can be adapted to enhance the protection afforded heavy-duty diesel engines. Particularly, the supplemental coolant additive of the present invention can be formulated to provide enhanced protection against corrosion and pitting of cylinder liners in diesel engines.

The cooling composition of the present invention provides unexpected results or enhanced protection in hard water. While not to be considered limiting in any fashion, it is thought that the addition of adipic acid to the cooling composition provides enhanced protection for metal surfaces by chelating with the alkali metal cations, specifically calcium and magnesium. Cooling systems for diesel engines and automobile engines include water as part of the coolant medium. Furthermore, during operation, the cooling systems frequently lose fluid either due to leakage or evaporation. Often, operators add make-up fluids such as water to the cooling system. The make-up fluid frequently is hard water, which is found in many parts of the world. Hard water causes many deleterious effects on the components of the cooling systems. These effects include increased corrosion of metal surfaces, particularly iron and aluminum surfaces. While not to be bound by any theory, it is thought that adipic acid and salts thereof provide significantly enhanced aluminum metal protection, and at least part of this effect may be reduced precipitation of silicates. Furthermore, the hard water can cause incompatibility problems with some of the anti-corrosion components. For example, hard water containing calcium and magnesium salts can cause silicate salts to precipitate or gel, which can decrease engine protection and increase incidences and the severity of corrosion. In a typical on-highway heavy-duty diesel engine cooling system, the flow rate can range from 80 to 150 gallons per minute. This means that flow velocities can reach or exceed 10 feet per second. Tests have shown that solder and aluminum are sensitive to the effects of high flow rate. These effects are acerbated by the addition of any solid or gelled additives.

It has unexpectedly been determined that the addition of adipic acid significantly enhances the protection of aluminum components in contact with hard water. For example, if additives, such as silicates, precipitate from the coolant composition, the desired aluminum protection previously afforded by the soluble silicate is drastically reduced. While not to be bound by any theory, it is thought that adipic acid and its salts provide significant enhanced aluminum metal protection, and at least part of this effect may be attributed to reduced precipitation of certain additives.

While not to be considered limiting in any fashion, it is also thought that the addition of adipic acid to the cooling composition provides enhanced protection for metal surfaces by chelating or combining with the alkali metal cations, specifically calcium and magnesium. These cations contribute to the buildup of scale on hot metal surfaces. The scale can drastically reduce and even eliminate flow through passageways in the cooling system. The scale can also inhibit efficient heat transfer from the hot metal surfaces to the coolant. Chelation of these cations can help reduce scale formation on hot surfaces and significantly reduces the detrimental effects of scale buildup.

In addition to providing make-up water for in-use cooling systems, frequently operators will add other additives to their cooling systems. Typically, the additives include a variety of anti-corrosion agents as specified above. It is not uncommon for an operator to "overdose" selected components of the anti-corrosive additive. In particular, it has been noted that nitrite levels in over-the-road diesel engine cooling systems have been increased to levels that can be detrimental to the aluminum and solder components of the cooling systems. The present invention provides enhanced protection for aluminum surfaces, thereby ameliorating some of the effects of over-dosing. It has also been determined that molybdate and the organic diacids provide ferrous and cylinder lining protection. Because the anti-corrosion properties are enhanced, the concentration of selected additives, for example, nitrite salts, can be reduced. This reduces the likelihood that an operator will overdose the cooling system with nitrate, harming the cooling system components.

For the purpose of promoting further understanding and appreciation of the present invention and its advantages, the following Examples are provided. It will be understood, however, that these Examples are illustrative and not limiting in any fashion.

EXAMPLES

The following antifreeze formulations, Examples 1–5, were prepared by combining the components listed in Table 1 with a fully formulated base antifreeze solution that included, in percent by weight based on the final total weight of the final antifreeze formulation, sodium borate (0.20%); sodium molybdate (0.30%); mercaptobenzothiazole (MBT) (0.40%, 50% active); tolyltriazole (0.20%); sodium silicate (0.10%) as well as surfactants, scale inhibitors and defoamers (0.05%) to provide a concentrated coolant composition. Each of the concentrated coolant compositions was then diluted with water having a hardness of about 300 ppm and a pH between about 8.3 and about 8.5 to provide the coolant compositions listed as examples 1–5. These coolant compositions were then evaluated according to ASTM D-2809 Standard Text Method for Cavitation Corrosion and Corrosion and Erosion-Corrosion Bench Test described below.

TABLE 1*

Concentrated Coolant Compositions

| Components | Example 1 | Example 2 | Example 3 | Example 4 | Example 5 |
|---|---|---|---|---|---|
| Adipic acid | 1.0% | — | — | 0.20% | 0.20% |
| Sebacic acid | — | 1.00% | — | — | — |
| Dodecane-dioic acid | — | — | 1.0% | 1.4% | 1.4% |
| $NaNO_2$ (Nitrite) | 0.36% | 0.36% | 0.36% | 0.36% | 0.20% |
| Test Procedure | | | | | |
| ASTM D-2809 | 6 | 7 | 7–8 | 7 | 8 |
| Erosion Corrosion Bench Test | 0.4 mg | 12.4 mg | 87 mg | 4.8 mg | 4.9 mg |

*Examples 1–5 were diluted 50:50 with water having a hardness of 300 ppm for both test procedures.

Erosion Corrosion Bench Test Procedure

This test procedure can help evaluate the effect of high flow velocities on solder and aluminum components. A fixture containing three preweighed bundles were placed in line of a flowing system. The flow rate and temperature were held constant throughout the test. The aluminum specimens were galvanically coupled to cast iron. The test duration was seven days. At the end of test, the weight loss due to erosion corrosion was determined on the aluminum samples. The flow stand had a loop capable of flowing 15 gallons (57 liters) of test solution at 5–50 gal. per minute (19–190) liters per minute), and holding 3 sets of test bundles ( 1 ⅝ in. (5.1 cm) diameter radiator hose). Test fixture was capable of holding 3 sets of test bundles (17 in. (43 cm) length).

A. Specimens and Test Solution Preparation:

Specimens: Aluminum and Cast Iron samples are of the type used in ASTM D-1384 glassware test. Various aluminum alloys for testing can be obtained from Metal Samples Co., Inc. Munford, Ala. The samples were cleaned before testing by placing them in acetone to remove processing oils. The samples were then wrapped in an absorbent towel and placed in dessicator to dry. Test solutions were prepared by combining antifreeze and SCA formulations in 300 ppm hard water. The hard water contained 277 mg $CaCl_2$, 123 mg $MgSO_4 \cdot 7H_2O$, and 210 mg $NaHCO_3$ per liter.

B. Test Procedure:

1. Samples were to the nearest 0.1 mg. Then using ASTM D-1384 hardware, test bundles were prepared in the following sequence: teflon spacer, aluminum specimen, steel spacer, cast iron specimen, steel spacer, aluminum specimen, teflon spacer. A brass machine screw was inserted through the test fixture and the test bundle in order to secure the bundle to the fixture. The aluminum specimens in each bundle were of the same alloy.

2. All bundles were prepared in this same sequence. The other bundles were attached to the test fixture, making sure that there is at least 4 inches between each bundle on the fixture.

3. The test fixture was placed in the flow loop and the connections secured to prevent leakage.

4. The test solution were heated to 88° C. (190° F.) and flow direct through the flow loop.

5. The flow rate was adjusted to achieve the proper flow velocity across the test fixture.

6. At the completion of the test, test fixtures were removed from flow loop.

7. The test bundles were dissembled and cleaned in accordance with ASTM D-1384. After drying the samples their weight was determined to the nearest 0.1 mg.

C. Calculations

Weight loss=A−B=C, where A=Weight before test, B=Weight after test, and C=Weight loss.

Due to the configuration of the individual test bundles, each alloy was run in duplicate. The individual weight losses for a single alloy agreed within 20%, and the average weight loss in milligrams was reported. (J. A. Worden, J. F. Burke & T. Cox, "Development of Aluminum Cooling System Components for a 10.8 liter Diesel Engine", SAE Technical Paper Series 960643 pp. 46–59, 1996, incorporated herein by reference).

Figure 2:
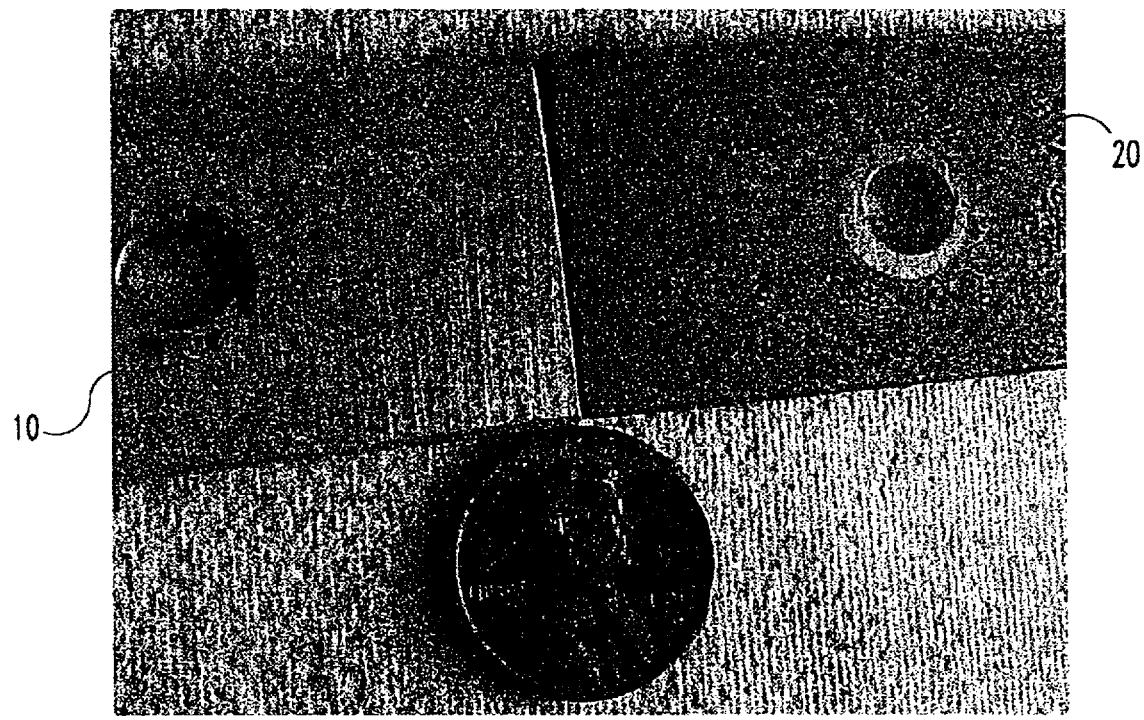
FIG. 2 is a scanned image of an alternate view of the coupons depicted in FIG. 1.

As can be seen from Table 1, the coolant composition containing adipic acid provides enhanced aluminum protection in the presence of hard water. Further as can be observed for Examples 4 and 5, inclusion of adipic acid in amounts as low as 0.2 wt % based upon the total weight of the supplemental coolant additive provides enhanced aluminum protection. FIGS. 1 and 2 are scanned images of portions of two aluminum coupons that were subjected to the Erosion Corrosion Test. Coupon 10 was immersed the Example 1 coolant formulation. Coupon 20 was immersed in the Example 3 coolant formulation. It can be readily observed that coupon 20 has significantly more surface erosion than coupon 10. The original milling marks can still be seen on coupon 10 as a series of substantially parallel lines or scratches extending across the width of the coupon. Conversely, coupon 20 is pitted, and the original milling marks are absent. The surface of coupon 20 was eroded sufficiently to remove the milling marks.

Further, it is understood that the addition of adipic acid synergistically enhances the to protection of both aluminum in the presence of nitrite salts and molybdate salts. In alternative embodiments, the addition of a combined organic acid component that includes adipic acid and sebacic acid provides even enhanced protection for the metal surfaces of the cooling system.

An exemplary composition of an additive having anti-corrosive properties is provided in Table 2.

TABLE 2

| Component | Weight Percent Based upon the Total Weight of the Solid Additive |
|---|---|
| Adipic acid or salt thereof | 1–10 |
| $C_9$–$C_{12}$ aliphatic dicarboxylic acid or salt | 1–30 |
| Nitrate ($NaNO_3$) | 5–25 |
| Nitrite ($NaNO_2$) | 5–25 |
| Silicate ($Na_2SiO_3$) | 1–15 |
| Mercaptobenzothiazole (MBT) | 1–15 |
| Tolyltriazole (TT) | 1–15 |
| Borate ($Na_2B_4O_7 \cdot 5\ H_2O$) | 15–50 |
| Phosphate ($Na_2HPO_4$) | 15–50 |
| Molybdate ($Na_2MoO_4 \cdot 2H_2O$) | 1–15 |

The present invention contemplates modifications as would occur to those skilled in the art. It is also contemplated that compositions and processes embodied in the present invention can be altered, rearranged, substituted, deleted, duplicated, combined, or added to other processes as would occur to those skilled in the art without departing from the spirit of the present invention. In addition, the various stages, steps, procedures, techniques, phases, and operations within these processes may be altered, rearranged, substituted, deleted, duplicated, or combined as would occur to those skilled in the art. All publications, patents, and patent applications cited in this specification are herein incorporated by reference as if each individual publication, patent, or patent application was specifically and individually indicated to be incorporated by reference and set forth in its entirety herein.

Further, any theory of operation, proof, or finding stated herein is meant to further enhance understanding of the present invention and is not intended to make the scope of the present invention dependent upon such theory, proof, or finding. While the invention has been illustrated and described in detail in the drawings, examples and foregoing description, the same is considered to be illustrative and not restrictive in character, it is understood that only the preferred embodiments have been shown and described and that all changes and modifications that come within the spirit of the invention are desired to be protected.

While the invention has been illustrated and described in detail in the drawings and foregoing description, the same is considered to be illustrative and not restrictive in character, it is understood that only the preferred embodiments have been shown and described and that all changes and modifications that come within the spirit of the invention are desired to be protected.

What is claimed is:

1. A supplemental coolant additive comprising:
    a corrosion inhibitor component including adipic acid and an aromatic monocarboxylic acid or dicarboxylic acid or salts of these acids, a nitrite salt, a molybdate salt and at least one compound selected from the group consisting of: a nitrate salt, a silicate salt, mercaptobenzothiazole, benzotriazole and tolyltriazole;
    a buffering agent including a sodium salt of at least one of a borate salt or a phosphate salt.

2. The additive of claim 1 wherein the weight ratio of nitrite salts to molybdate salts is less than about 2:1.

3. The additive of claim 1 wherein the weight ratio of nitrite salts to molybdate salts is less than about 1:1.

4. The additive of claim 1 wherein said buffer component is formulated to provide a aqueous based solution having a pH level between about 7.5 and about 11 pH units.

5. The additive of claim 4 formulated to provide an aqueous solution having a pH level between about 8 and about 10 pH units.

6. The additive of claim 1 wherein the corrosion inhibitor component includes a $C_9$ to $C_{12}$ aliphatic dicarboxylic acid or salt thereof.

7. The additive of claim 8 comprising water, an alcohol, a glycol or a mixture thereof.

8. The additive of claim 1 comprising, in percent by weight based on the total weight of the additive:
    between about 0.1% and about 10% adipic acid or a salt thereof,
    between about 0.5% and about 5% a molybdate salt;
    between about 1% and about 40% a nitrate salt,
    between about 1% and about 15% a nitrite salt,
    between about 0.5% and about 10% mercaptobenzothiazole, benzotriazole or tolyltriazole or a mixture thereof, and
    between about 10% and about 50% of a phosphate salt.

9. The additive of claim 1 consisting essentially of, in weight percent based upon the total weight of the supplemental coolant additive:

between about 0.1% and about 40% adipic acid or a salt thereof, between about 0.5% and about 15% a molybdate salt;

between about 1% and about 40% a nitrate salt, between about 1% and about 15% a nitrite salt, between about 0.5% and about 15% silicate salts between about 0.5% and about 10% mercaptobenzothiazole, benzotriazole, or tolyltriazole or a mixture thereof, and between about 10% and about 50% borate salt.

10. The additive of claim 1 comprising, in percent by weight based on the total weight of the additive:

between about 0.1% and about 40% adipic acid or a salt thereof between about 0.5% and about 15% a molybdate salt;

between about 1% and about 40% a nitrate salt, between about 1% and about 15% a nitrite salt, between about 0.5% and about 10% mercaptobenzothiazole, benzotriazole or tolyltriazole or a mixture thereof, and at least one compound selected from the group consisting of: between about 0.5% and about 5% silicate salts, between about 10% and about 50% of a phosphate salt, between about 10% and about 50% borate salt and mixtures thereof.

11. The additive of claim 1 provided as a powder.

12. The additive of claim 1 provided as a pellet or a briquette.

13. The additive of claim 1 provided as a paste or liquid concentrate.

14. A supplemental coolant additive comprising:

a corrosion inhibitor component including adipic acid or a salt thereof, a nitrite salt, a molybdate salt and at least one of a nitrate salt, a silicate salt, mercaptobenzothiazole benzotriazole, or tolyltriazole;

a buffering agent; and hard water.

15. The additive of claim 14 wherein the buffering agent includes a borate salt.

16. The additive of claim 14 wherein the buffering agent includes a phosphate salt.

17. The additive of claim 14 wherein the weight ratio of nitrite salts to molybdate salts is less than about 2:1.

18. The additive of claim 14 wherein the weight ratio of nitrite salts to molybdate salts is less than about 1:1.

19. The additive of claim 14 comprising, in weight percent based upon the total weight of the additive and measured as the free acid, between about 0.05% and about 1% adipic acid or salt thereof.

20. A supplemental coolant additive in a solid form or as a suspension comprising:

a corrosion inhibitor component including adipic acid or a salt thereof, a $C_9$–$C_{12}$ aliphatic dicarboxylic acid or salt thereof, an aromatic monocarboxylic or dicarboxylic acid or salt thereof, a nitrate salt, a molybdate salt, and at least one of a nitrite salt, a silicate salt or an azole; and a buffering agent.

21. A method of reducing the corrosion of metal surfaces in a cooling system having a recirculating liquid coolant comprising hard water, said method comprising:

adding to said liquid coolant in a solid form or as a suspension of an anti-corrosion additive including a buffering agent, adipic acid an aromatic monocarboxylic or dicarboxylic acid or a salt thereof, a molybdate salt, a nitrite salt, and at least a compound selected from the group consisting of: mercaptobenzothiazole, benzotriazole, tolyltriazole, a nitrate salt and a silicate salt.

22. The method of claim 21 wherein the anti-corrosion additive is provided in the form of a pellet.

23. The method of claim 21 wherein the anti-corrosion additive is encased in a polymeric coating.

24. The method of claim 21 wherein said adding includes releasing the corrosion additive into the liquid coolant over a time period extending to at least 50 hours of operation.

25. The additive of claim 1 comprising adipic acid, dodecanedioic acid, sebacic acid and benzoic acid.

26. The additive of claim 14 comprising polyethylene glycol or propylene glycol.

27. The additive of claim 14 comprising adipic acid, dodecanedioic acid, sebacic acid and benzoic acid.

28. The method of claim 21 wherein the anti-corrosion additive includes a $C_9$–$C_{12}$ aliphatic dicarboxylic acid or salt thereof.

* * * * *